Figure 1:
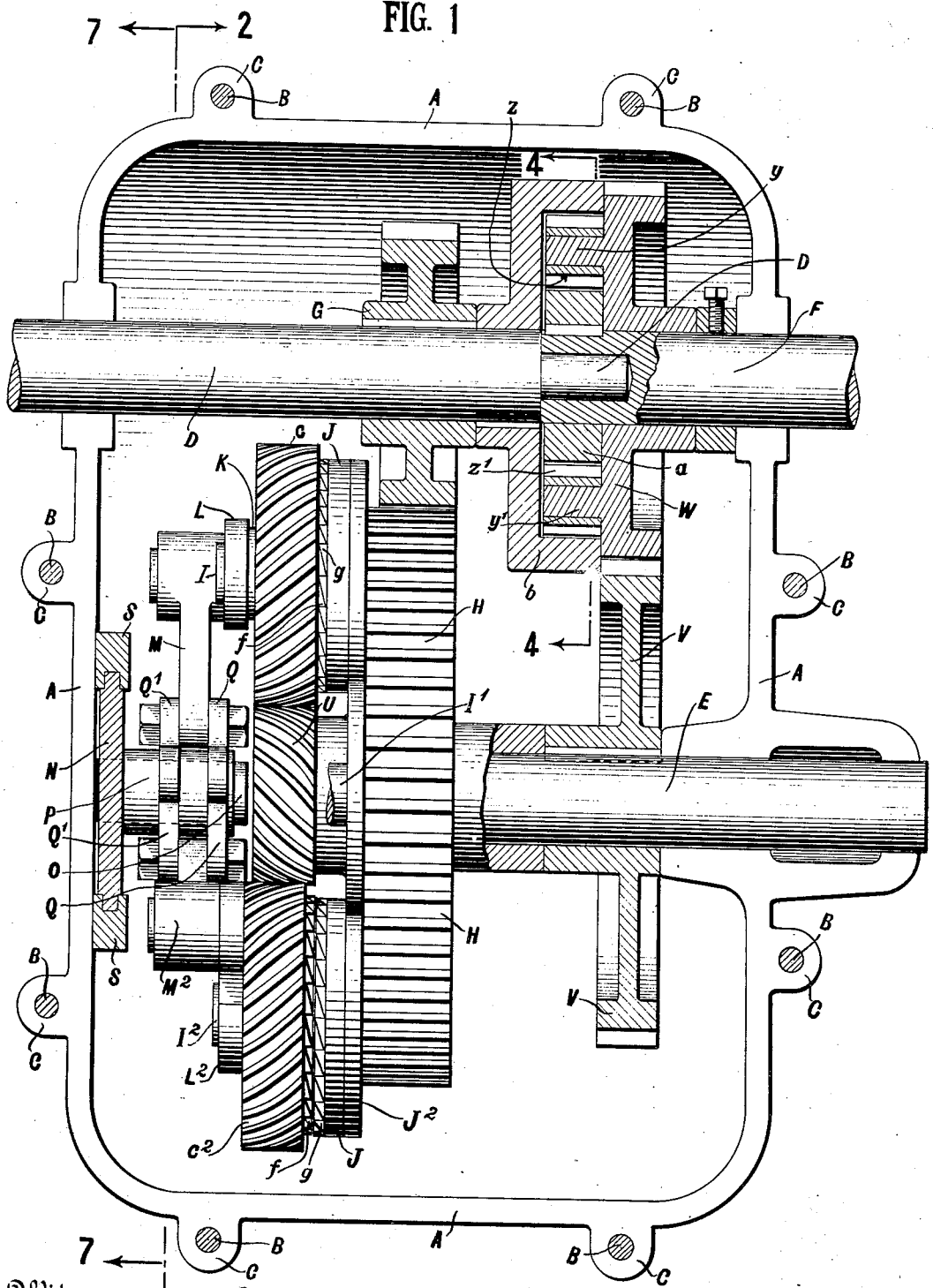

A. W. PUPKE.
VARIABLE SPEED MECHANISM.
APPLICATION FILED AUG. 8, 1907.

908,697.

Patented Jan. 5, 1909.
4 SHEETS—SHEET 1.

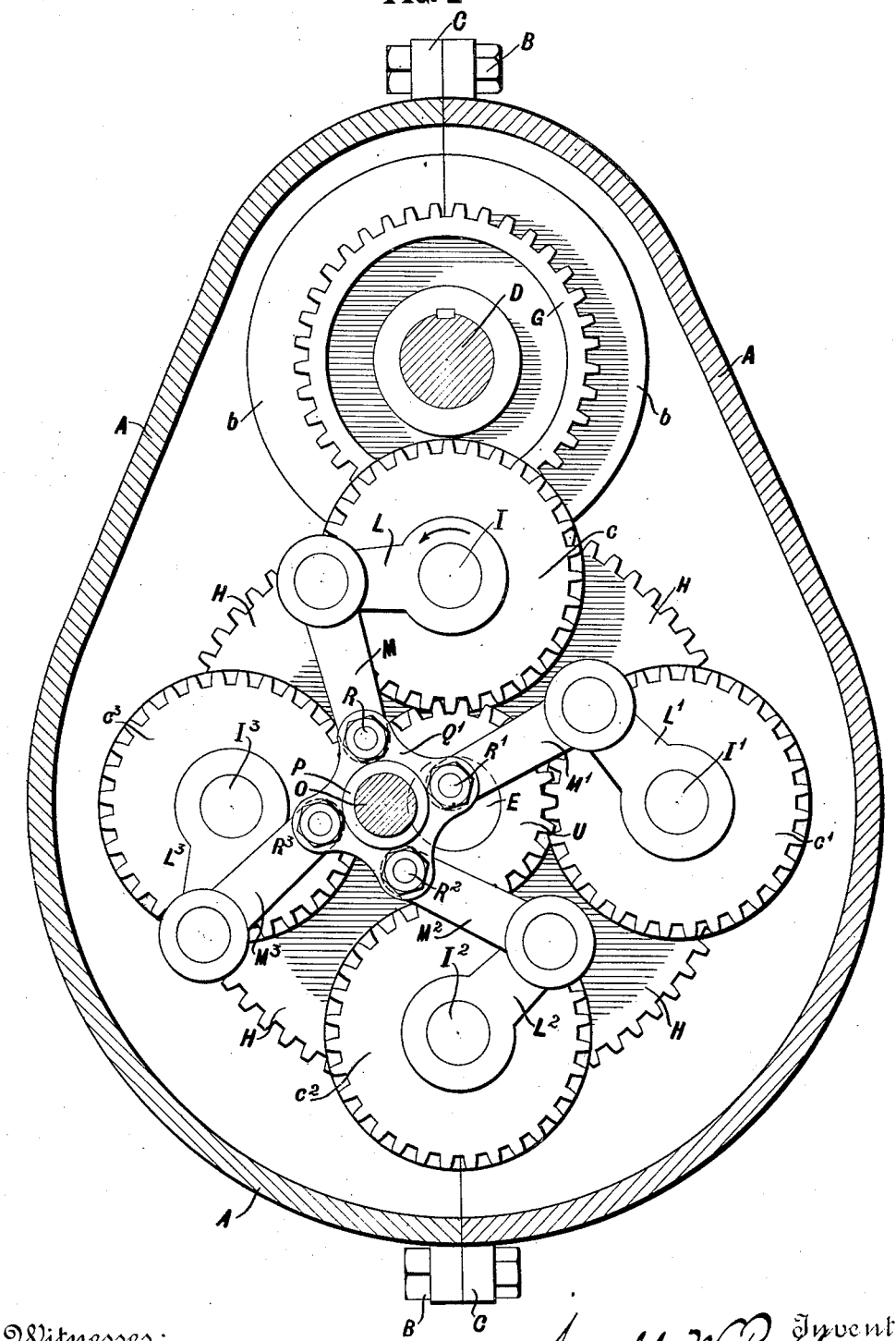

A. W. PUPKE.
VARIABLE SPEED MECHANISM.
APPLICATION FILED AUG. 6, 1907.
908,697.
Patented Jan. 5, 1909.
4 SHEETS—SHEET 3.
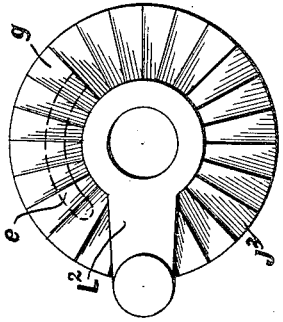
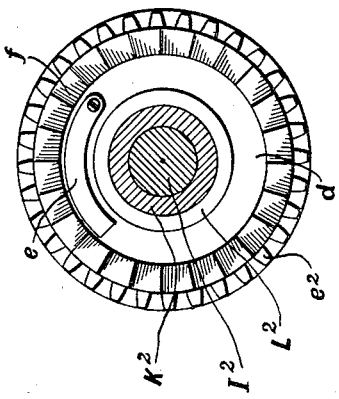
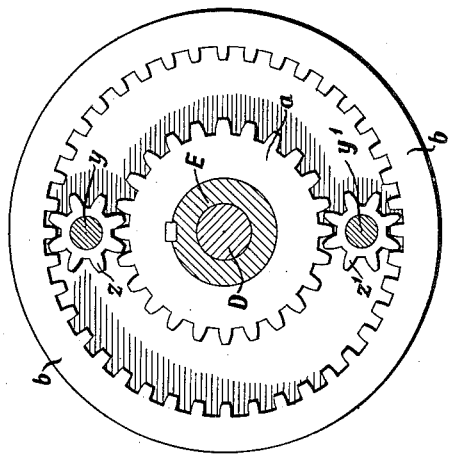
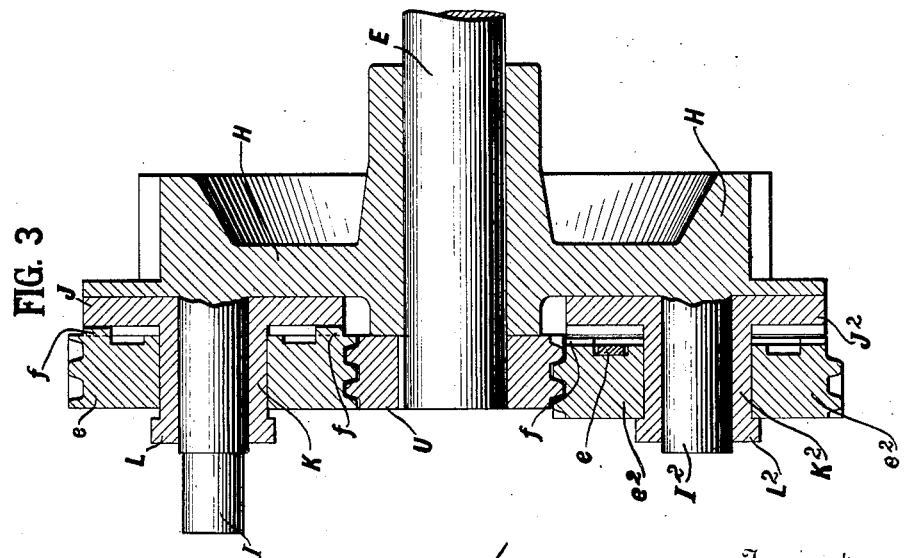
Witnesses:
Max B. A. Doring
F. M. Donstach
Inventor
Arnold W. Pupke
By his Attorney
Phillips Abbott

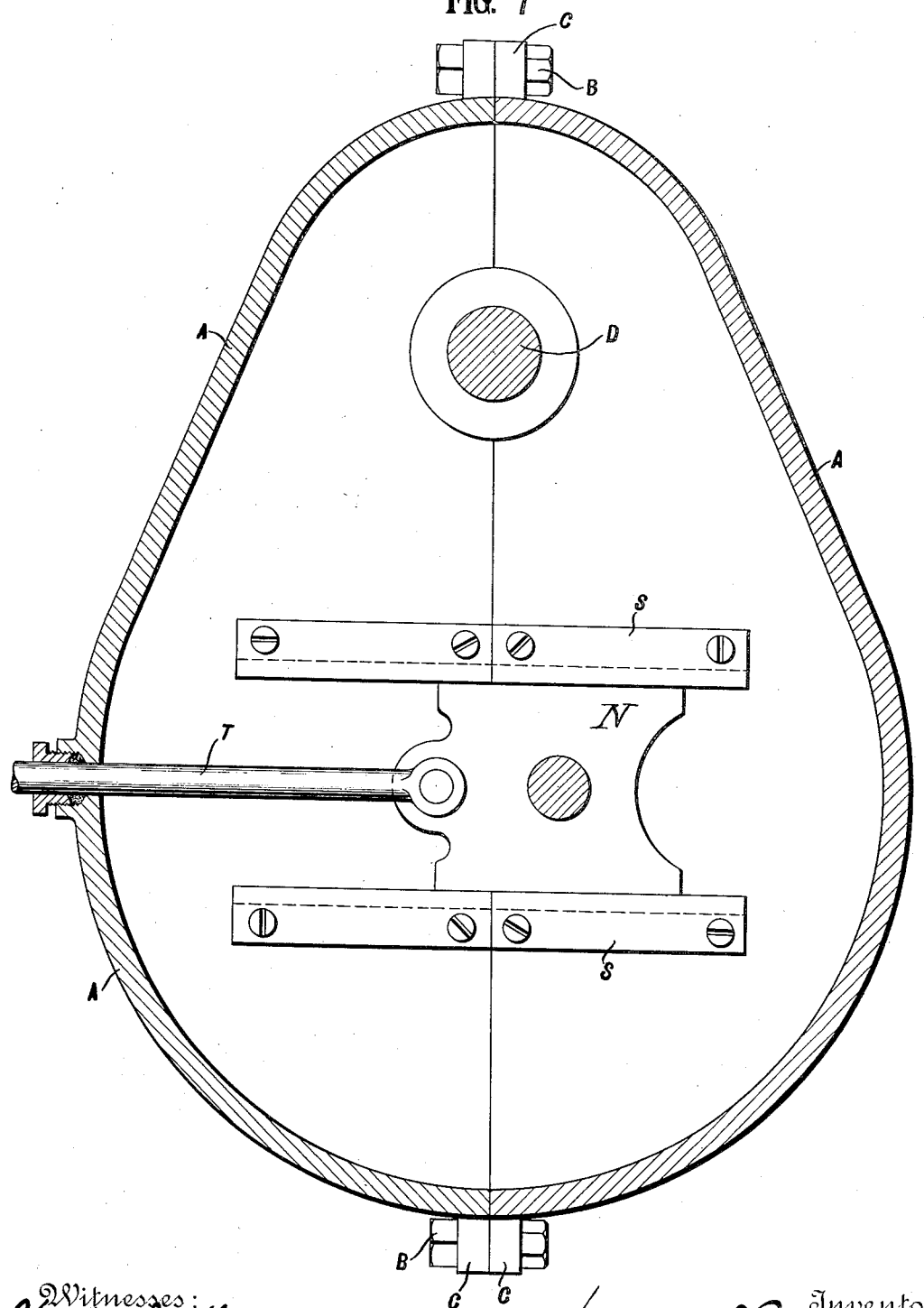

UNITED STATES PATENT OFFICE.

ARNOLD W. PUPKE, OF NEW YORK, N. Y.

VARIABLE-SPEED MECHANISM.

No. 908,697.　　　Specification of Letters Patent.　　　Patented Jan. 5, 1909.

Application filed August 6, 1907. Serial No. 387,251.

*To all whom it may concern:*

Be it known that I, ARNOLD W. PUPKE, a citizen of the United States, and a resident of the borough of Manhattan, city, county, and State of New York, have invented certain new and useful Improvements in Variable-Speed Mechanism, of which the following is a specification, reference being had to the accompanying drawings, in which—

Figure 1 illustrates a view of the mechanism, a part of the casing being removed and a part of the interior mechanism shown in elevation and a part in section; Fig. 2 illustrates an elevation of the mechanism taken at right angles to Fig. 1, the casing being shown in section; Fig. 3 illustrates a sectional view of certain parts of the speed differentiating gears; Fig. 4 illustrates an elevation of what I call the transforming mechanism; Fig. 5 illustrates a face view of one of the speed differentiating gears, looking toward the left, as in Fig. 3; Fig. 6 illustrates a face view of what I term the crank plate, looking from left to right, as in Fig. 3; Fig. 7 illustrates a detail of the cross head and actuating parts.

The purpose of this invention is to provide mechanism whereby the speed at which an automobile, autoboat, or similar vehicle shall be driven may be differentiated from the speed of the motor.

Referring to the drawings, A represents a casing which I prefer to employ to inclose the mechanism for its protection and likewise appropriate parts of it may be employed as bearings for the parts. The general shape of the casing is shown in Figs. 1 and 2. I prefer that its two parts be connected together by bolts B passing through lugs C cast on the casing.

D is the motor shaft, E is a countershaft, F is the driving shaft.

G is a gear keyed to the shaft D.

H is a gear loose on the shaft E.

I, I′, I$^2$, I$^3$ are trunnions which form part of the gear H. Upon each of the trunnions is mounted a part which, as stated above, I call a crank plate. Two of them, J and J$^2$ only are shown. These parts consist of a plate section, just indicated, a sleeve section K and K$^2$ and a crank part or section L, L′, L$^2$, L$^3$. These cranks are best shown in Figs. 2 and 6, and to them are pivoted connecting links, M, M′, M$^2$, M$^3$, which in turn are pivoted, as shown in Figs. 1, 2 and 7, to a sliding cross-head N, which is provided with a centrally disposed stud O, upon which is mounted a sleeve P, from which project radially two plates Q, Q′, between which the ends of the links M, M′, M$^2$, M$^3$, enter and to which they are pivotally connected, as shown, by bolts R, R′, R$^2$, R$^3$. The cross head can be moved in slideways S, S, by the operator who actuates it by the actuating rod T, connected with any suitable lever mechanism.

Upon the inner end of the countershaft E is keyed a gear U and upon the same shaft is keyed another larger gear V, which meshes into a gear W which is loose upon the driving shaft F. This gear W has upon it two trunnions Y, Y′, upon which are loosely mounted pinions Z, Z′, which mesh into a pinion *a* keyed on the shaft F and likewise into an internal gear *b* which is keyed on the motor shaft D.

Upon each of the sleeves K, etc., of the crank plate mechanism are loosely mounted gears *c*, *c′*, *c*$^2$, *c*$^3$, recessed on their interior surface, as shown at Fig. 5, at *d*, and in each recess is mounted spring pawl *e*, and near the periphery of these gears and upon the same side as the pawls are a series of projecting ratchet teeth *f* (see Figs. 1, 3 and 5). I prefer to make the spring pawls of fiber or equivalent noiseless material, although this is not essential. Corresponding surfaces on the crank plates, J, etc. (see Fig. 6) are provided with ratchet teeth *g*, with a part of which the pawls *e* engage and with another part, the peripheral part, the ratchet teeth *f* engage. The faces of the gears *c*, *c′*, etc., and the face of the gear U on the end of the shaft E, are all provided with diagonal cogs or teeth, so that when pressure is applied between these gears, there is a tendency to thrust one or the other of them longitudinally.

Having described the construction and arrangement of the parts, the operation of the invention as embodied in the form illustrated in these drawings, is as follows: The motor shaft is driven at the speed of the motor, whatever it may be. Through the gear G, the power is transmitted to the gear H and in its rotation, it carries about its center the trunnions, I, I′, etc., and with them the crank plates J, etc., and the gears *c*, *c′*, etc. If the cross head N is in such position that the center or axis of its stud O is coincident with the center or axis of the counter shaft E, then the gears $c$, $c'$, etc., will have no movement about their individual axes, since they, and all parts with which they are connected, are carried about the shaft E in stationary condition relative to their several axis of its stud O is eccentric to the axis of equal to the speed of the gear H. If, however, the cross head N be so moved that the axis of its stud O is eccentric to the axis of the countershaft E, then, because of the cranks L, L', etc., and the links M, M', etc., and the spring pawls $e$ and interlocking ratchet teeth $f$ and $g$, the details of which will be hereinafter explained, the several cranks L, L', etc., will each have oscillatory movement on their individual axes, and consequently will oscillate the crank plates J, etc., once in each complete revolution of the gear H. This movement is given to them as follows, reference being had to Fig. 2, in which it will be seen that the relative positions of the cranks L, L', etc., to the links, M, M', etc., continually change during the revolution of the parts, and this is occasioned by the varying distances separating the axes of the several cranks L, relative to the axis of the trunnion or stud O on the sliding cross head N; that is to say, the distance separating the center of the trunnion $I^3$ (upon which the crank $L^3$ oscillates) from the center of the stud O is the minimum distance and increases as the parts move on the upward arc and reaches the maximum as the parts describe the downward arc, as illustrated at L', and gradually reduces again as the parts pass through the lower arc and return to the starting point. Consequently, as the mechanism shown in the drawings is organized, during the time that the cranks L, etc., are passing over the upper arc of their rotation until they have made substantially one quarter revolution, they are oscillated about their axes in the direction shown by the arrow. If, therefore, the gears $c$, $c'$, etc., be connected and disconnected at the appropriate times from the crank plates, they likewise will receive the movement thereof, resulting in an acceleration in the rotation of the central gear U.

In the drawings hereof I show one method of effecting the connection and disconnection referred to, that is to say, the pawls $e$ attached to each of the gears, when the crank plates revolve slower about their axes than the gears revolve about their axes, slip over the ratchet teeth $g$ on the crank plates; but when a crank plate, under the action of its crank and connecting link and the position of the cross-head, revolves about its axis faster than its companion gear driven by the central gear U revolves about its axis, then the said pawl will engage in the ratchet teeth $g$ of the crank plate and a corresponding accelerated movement be transmitted through the pawl to the gear. Thus pressure is generated between the diagonal cogs on the gears and those on the central gear U and consequently the lateral thrust heretofore referred to takes place and the ratchet teeth $f$ of the gear at that time subjected to these influences are caused to engage with the ratchet teeth $g$ of the crank plate, the gear moving longitudinally on the sleeve K upon which it rotates. Consequently the accelerated movement of the crank plates referred to is transmitted to the gears, which in turn transmit it to the central gear U which is fixed upon the countershaft E. When, however, in the rotation of the parts, the gear under consideration begins to describe the downward arc of its rotation, then the following gear succeeding it in the operations and movements just described, on account of its acceleration, causes the preceding gear, the speed of whose crankplate is decreasing, to disengage its ratchet teeth from those of its crank-plate by a return longitudinal movement on its trunnion caused by the reverse operation of the diagonal cogs upon the gear and the central gear U and likewise by the backward thrust of the ratchet teeth. In this way, in succession, the gears $c$, $c'$, etc., in their rotation, severally take up the increase in speed, automatically moving into and out of coöperative relation with the other parts as described. The positions of the gears $c$, $c'$, etc., relative to their companion crank plates, when the ratchet teeth are engaged and also disengaged are shown in Figs. 1 and 3. It is obvious that the extent to which the speed will be carried will depend upon the degree of eccentricity of the axis of the stud O of the sliding cross-head N in relation to the axis of the counter shaft E, also the ratio of the diameter of the central gear U to the diameter of the gears $c$, $c'$, etc. These are mere matters of mechanical detail to be regulated as each constructor may desire.

The results of the speed variations effected as above set forth are as follows: If, as stated, the axis of the stud O of the sliding cross head be coincident with that of the countershaft E, then the speed of the motor shaft transmitted through the gear G to the gear H, will rotate the countershaft E and gear V keyed upon it at a speed depending upon the relation of these gears. When, however, the speed varying devices above described are brought into operation, then the countershaft E and the gear V keyed to it, may be made to revolve at different degrees of speed, depending upon the position of the sliding cross-head, so that the speed of the gear E, which revolves loosely upon the driving shaft F, may be varied as desired. Therefore, if the cross-head N is placed in such position that the speed of the gear W be the same as the speed of the motor shaft D, then the internal gear $b$ moving at the same speed as the gear W, the gear $a$, which is fastened to the driving shaft F, also moves at the same speed. If the cross-head N is placed in such position that the speed of the gear W is greater than the speed of the motor shaft D, then the resulting speed of the driving shaft F will be greater than the speed of the motor shaft D. Again the cross head N can be placed in such position that the speed of the gear W will be such in relation to the speed of the motor shaft D, that there will be no movement of the driving shaft F. Consequently any degree of speed may be had between the maximum and minimum speeds of the mechanism.

This invention embodies certain important and decided advantages in mechanism of this class. It is compact; also there is permanent engagement of all the moving parts, excepting the engagement between the speed varying gears and the crankplates and that is automatically effected without any care or attention on the part of the operator; also by the simple movement of the operator's hand lever, in a smooth, noiseless and strainless manner, the cross head is without jar or shock made to effect the speed variations; also by means of the internal gear on the motor shaft which engages with the pinions Z, Z′, carried by the loose gear on the driving shaft, the ratio of the maximum and minimum speed variations possible for the driving shaft is greater than the ratio of the maximum and minimum speed variations of the countershaft.

It will be obvious to those who are familiar with this art that extensive modification may be made in the details of construction of the parts illustrated and described without departing from the essentials of the invention; in other words, that the construction and relative location of the parts illustrated by me is one form only in which the invention may be embodied. Of course intermediate gearing, reverse gear mechanism, details of bearings, etc., may be introduced, varied and made such as preferred.

I claim:

1. In mechanism of the class stated, a motor shaft, a countershaft and a driving shaft, a gear keyed to the motor shaft, a loose gear on the countershaft, trunnions carried by the said last-named gear, crankplates and cranks mounted on said trunnion, a sliding cross-head adapted to register with and be eccentric to the axis of the countershaft, links connecting the cranks with the cross-heads, speed varying gears mounted on the sleeves of the crankplates, a central gear keyed to the countershaft and with which said speed varying gears mesh, means whereby the speed varying gears will automatically engage with the crankplates when the latter move faster than the former and disengage therefrom at other times, a gear keyed to the countershaft, a loose gear on the driving shaft, with which the last-named gear meshes, a gear fixed on the end of the driving shaft, an internal gear fixed on the motor shaft, pinions carried by said loose gear and which mesh into said fixed gear on the driving shaft and also into said internal gear and means whereby the operator may slide the cross head.

2. In mechanism of the class stated, a motor shaft, a counter shaft and a driving shaft, a loose gear on the counter shaft, means to transmit the power from the motor shaft to the said loose gear, trunnions carried by the loose gear, crankplates and cranks mounted on the said trunnions, a sliding cross-head adapted to register with and be eccentric to the axis of the counter shaft, links connecting the cranks with the cross-head, speed varying gears mounted on the sleeves of the crankplates, a central gear keyed to the countershaft and with which said speed varying gears mesh, means whereby the speed varying gears will automatically engage with the crankplates when the latter move faster than the former and disengage therefrom at other times and means for transmitting the varied speed from the countershaft to the driving shaft.

3. In mechanism of the class stated, a motor shaft and a counter shaft, a rotating gear driven by the motor shaft, trunnions carried by said gear, crankplates and cranks mounted on said trunnions, a sliding cross-head, links connecting the cranks with the cross-head, speed varying gears mounted on the sleeves of the crankplates, a central gear mounted upon the countershaft and with which said speed varying gears mesh, means whereby the speed varying gears will automatically engage with the crankplates when the latter move faster than the former and disengage therefrom at other times and means whereby the varied speed may be transmitted to the driven axle of the mechanism.

4. In mechanism of the class stated, a counter shaft, a gear loose upon the countershaft rotated by the motor shaft, trunnions carried by said gear, crank plates and cranks mounted on the trunnions, a sliding cross head adapted to register with and be eccentric to the axis of the gear, links connecting the cranks with the cross head, speed varying gears concentric with the crank plates and adapted to independent rotary movement, a central gear keyed to the counter shaft and with which said speed varying gears mesh, means whereby the speed varying gears will automatically engage with the crank plates when the latter move faster than the former and disengage therefrom at other times, a driven axle and means for transmitting the varied speed to the driven axle.

5. In mechanism of the class stated, a motor shaft, a countershaft and a driving shaft, speed varying mechanism interposed between the motor shaft and the counter shaft, a gear fixed on the countershaft and which engages with a loose gear on the driving shaft, a gear fixed on the end of the driving shaft, an internal gear fixed on the motor shaft and pinions carried by said loose gear on the driving shaft and which mesh into the fixed gear on the driving shaft and into said internal gear.

6. In mechanism of the class stated, a motor shaft, a counter shaft and a driving shaft, a gear keyed to the motor shaft, a loose gear on the counter shaft, speed varying gears carried by said last-named gear about its center, a central gear keyed to the countershaft and with which said speed varying gears mesh, means whereby the speed varying gears are successively turned upon their individual axes during a portion of their rotation about the central gear, and gearing connecting the counter-shaft with the driven shaft.

7. In mechanism of the class stated, a motor shaft, a counter shaft and a driving shaft, a gear keyed to the motor shaft, a loose gear on the counter shaft, trunnions carried by said last-named gear, crank plates and cranks mounted on said trunnions, a sliding cross head adapted to register with and be eccentric to the axis of the counter shaft, links connecting the cranks with the cross head, speed varying gears mounted on the sleeves of the crank plates, a central gear keyed to the counter shaft, said central gear and speed varying gears having diagonal or angular cogs or teeth, said speed varying gears and crank plates having ratchet teeth, a pawl on each of the speed varying gears adapted to engage with the ratchet teeth on the crank plates, whereby when the cross head is eccentric to the axis of the counter-shaft, the crank plates will be oscillated and the ratchet teeth of the speed varying gears caused to be automatically engaged with and disengaged from those on the crank plates, and gearing connecting the countershaft with the driving shaft.

8. In mechanism of the class stated, a motor shaft and a counter shaft, a loose gear on the counter shaft, trunnions carried by said gear, crank plates and cranks mounted on said trunnions, a sliding cross head adapted to register with and be eccentric to the axis of the counter shaft, links connecting the cranks with the cross head, speed varying gears having diagonal cogs and mounted on the sleeves of the crank plates, a central gear having diagonal cogs and keyed to the counter shaft, said speed varying gears and crank plates having ratchet teeth, a spring pawl on each of the speed varying gears and which engages with the ratchet teeth on the crank plates, whereby, when the cross head is eccentric to the axis of the counter shaft, the speed varying gears automatically and successively engage with and are driven by the crank plates during a part of the oscillation of the latter.

9. In mechanism of the class stated, a motor shaft, a counter shaft and a driving shaft, a loose gear on the counter shaft driven by the motor shaft, speed varying gears having diagonal teeth and carried by said last-named gear, crank plates and cranks concentric with said speed varying gears and likewise carried by the loose gear on the counter-shaft, a sliding cross head adapted to register with and be eccentric to the axis of the counter shaft, links connecting the cranks with the cross head, said speed varying gears and crank plates having ratchet teeth, a spring pawl carried by each of the speed varying gears and adapted to engage with the ratchet teeth on the crank plates, a central gear having diagonal teeth and keyed to the counter shaft, whereby, when the cross head is eccentric to the axis of the counter shaft, the ratchet teeth of the speed varying gears will automatically engage with and disengage from the ratchet teeth on the crank plates during different portions of the oscillations of the latter and gearing connecting the counter shaft with the driving shaft.

10. In a mechanism of the class stated, a motor shaft, a counter shaft and a driving shaft, a loose gear on the counter shaft driven by the motor shaft, speed varying gears having ratchet teeth and carried by said last-named gear, crank plates having ratchet teeth and cranks concentric with said speed varying gears and likewise carried by the loose gear on the counter shaft, a sliding cross head adapted to register with and be eccentric to the axis of the counter-shaft, links connecting the cranks with the cross head, a noiseless spring pawl carried by each of the speed varying gears and adapted to engage with the ratchet teeth on the crank plates, a central gear keyed to the counter shaft, said speed varying gears and said central gear having diagonal teeth, whereby, when the cross head is eccentric to the axis of the counter shaft, the ratchet teeth of the speed varying gears will automatically engage with and disengage from the ratchet teeth on the crank plates during different portions of the oscillations of the latter, and gearing connecting the counter shaft with the driving shaft.

11. In mechanism of the class stated, a motor shaft, a countershaft and a driving shaft, speed varying gears connecting the motor shaft with the counter shaft, other gears connecting the countershaft with the driving shaft and an internal gear on the motor shaft whereby the speed of the driving shaft may equal that of the motor shaft or be differentiated therefrom.

In testimony whereof I have signed my name to this specification in the presence of two subscribing witnesses.

ARNOLD W. PUPKE.

Witnesses:
 WALTER H. CRITTENDEN,
 F. M. DOUSBACH.